US010960708B2

(12) United States Patent
Kwark et al.

(10) Patent No.: US 10,960,708 B2
(45) Date of Patent: Mar. 30, 2021

(54) SEMI-PNEUMATIC TIRE AND SEMI-PNEUMATIC TIRE MANUFACTURING METHOD

(71) Applicant: Kumho Tire Co., Inc., Gwangju (KR)

(72) Inventors: Chul-Woo Kwark, Gwangju (KR); Kee-Woon Kim, Gwangju (KR); Chang-Jung Park, Gwangju (KR); Gwi-Sung Shin, Gwangju (KR); Soon-Wook Hwang, Gwangju (KR)

(73) Assignee: KUMHO TIRE CO., INC., Gwangju (KR)

( * ) Notice: Subject to any disclaimer, the term of this patent is extended or adjusted under 35 U.S.C. 154(b) by 212 days.

(21) Appl. No.: 15/708,749

(22) Filed: Sep. 19, 2017

(65) Prior Publication Data

US 2018/0290492 A1  Oct. 11, 2018

(30) Foreign Application Priority Data

Apr. 7, 2017  (KR) .................. 10-2017-0045437

(51) Int. Cl.
*B60C 7/12* (2006.01)
*B60C 9/18* (2006.01)
(Continued)

(52) U.S. Cl.
CPC ............ *B60C 7/12* (2013.01); *B29D 30/0678* (2013.01); *B60C 5/002* (2013.01); *B60C 9/18* (2013.01); *B60C 11/00* (2013.01); *B60C 19/122* (2013.01)

(58) Field of Classification Search
CPC .... B60C 7/12; B60C 7/18; B60C 7/00; B60C 3/04; B60C 7/125; B60C 17/06;
(Continued)

(56) References Cited

U.S. PATENT DOCUMENTS 1,401,610 A  12/1921 Kuhn
2002/0020939 A1*  2/2002 Jasani .................... B29D 30/04
264/262
(Continued)

FOREIGN PATENT DOCUMENTS

CN  1778582 A  5/2006
CN  202046165  * 11/2011 ............. B60C 19/00
(Continued)

*Primary Examiner* — Matthew J Daniels
*Assistant Examiner* — Shibin Liang
(74) *Attorney, Agent, or Firm* — Saliwanchik, Lloyd & Eisenschenk (57) ABSTRACT

A semi-pneumatic tire includes a tread portion configured to make contact with a road surface, a non-pneumatic portion coupled to an inner circumferential surface of the tread portion. The semi-pneumatic tire further includes a pneumatic portion coupled to an inner circumferential surface of the non-pneumatic portion and provided with a space into which an air is filled, and bonding layers respectively interposed between the tread portion and the non-pneumatic portion and between the non-pneumatic portion and the pneumatic portion. The non-pneumatic portion includes a band portion including an inner band coupled to an outer circumferential surface of the pneumatic portion and an outer band spaced apart from the inner band and surrounding an outer circumferential surface of the inner band, and spokes provided between the inner band and the outer band to connect the inner band and the outer band.

8 Claims, 10 Drawing Sheets

(51) Int. Cl.
*B60C 11/00* (2006.01)
*B60C 5/00* (2006.01)
*B60C 19/12* (2006.01)
*B29D 30/06* (2006.01)

(58) Field of Classification Search
CPC ..... B60C 7/71; B60C 7/3104; B60C 7/71125; B29D 30/0678; B29D 30/04; B29D 29/00; B60B 9/26; B60B 9/04
See application file for complete search history.

(56) References Cited

U.S. PATENT DOCUMENTS

| | | |
|---|---|---|
| 2006/0108038 A1 | 5/2006 | Ishida |
| 2010/0018622 A1* | 1/2010 | Tanno ................ B29D 30/0061 152/510 |
| 2013/0263985 A1* | 10/2013 | Alshdaifat .............. B60C 17/06 152/155 |
| 2014/0367007 A1* | 12/2014 | Thompson ............. B60C 7/102 152/17 |
| 2015/0136290 A1 | 5/2015 | Kim |
| 2017/0297371 A1* | 10/2017 | Sportelli ................ B60C 7/102 |
| 2018/0029419 A1* | 2/2018 | Kim .......................... B60C 7/12 |

FOREIGN PATENT DOCUMENTS

| | | | | |
|---|---|---|---|---|
| CN | 104149551 A | | 11/2014 | |
| CN | 205523430 U | | 8/2016 | |
| EP | 2658733 B1 | | 5/2017 | |
| JP | 2008105644 | * | 5/2008 | ............... B60C 7/18 |
| JP | 2012126233 A | | 7/2012 | |
| JP | 6143660 B2 | * | 12/2013 | ............... B60C 7/00 |
| KR | 1020110018527 A | | 2/2011 | |
| KR | 20130037808 | * | 11/2011 | ............... B60C 7/00 |
| KR | 101222693 B1 | | 1/2013 | |
| KR | 101271029 B1 | | 6/2013 | |
| KR | 1020130073112 A | | 7/2013 | |
| KR | 1020150021801 A | | 3/2015 | |
| WO | 2005047028 A1 | | 5/2005 | |
| WO | WO-2017116481 A1 | * | 7/2017 | ............... B60C 7/16 |

* cited by examiner

SEMI-PNEUMATIC TIRE AND SEMI-PNEUMATIC TIRE MANUFACTURING METHOD

CROSS-REFERENCE TO RELATED APPLICATIONS

This application is based on and claims priority from Korean Patent Application No. 10-2017-0045437, filed on Apr. 7, 2017, the disclosure of which is incorporated herein in its entirety by reference.

TECHNICAL FIELD

The present disclosure relates to a semi-pneumatic tire and a semi-pneumatic tire manufacturing method.

BACKGROUND

Tires are mounted on wheels of various motor vehicles ranging from small motor vehicles to heavy motor vehicles and are configured to perform a function of supporting the load of a motor vehicle, a power transmission function of transmitting the power of a motor vehicle to the ground, and a function of absorbing vibrations or shocks generated from the ground when a motor vehicle travels.

In general, a pneumatic tire has been mainly used as the aforementioned tire. The pneumatic tire maintains an air pressure therein and has an action of buffering collision and bending/stretching, thereby providing excellent ride comport and vibration-absorbing performance. However, when the pneumatic tire is broken due to getting pricked by an external object or a shock, the internal air pressure is not maintained. In this case, the pneumatic tire is difficult to perform a function as a tire. In addition, if the pneumatic tire is broken during the travel of a motor vehicle, the steering or braking ability of the motor vehicle is reduced. This may lead to a safety problem.

In order to solve such a problem, there has been developed a non-pneumatic tire that does not require filling of an air. In the non-pneumatic tire, elastic spokes are provided between a tread and a wheel in order to perform a function of an internal air pressure of a conventional pneumatic tire.

The non-pneumatic tire has an effect of preventing puncture under various vehicle travel environments. However, due to the limited flexibility of the spokes, the non-pneumatic tire suffers from a problem that the ride comfort and the vibration-preventing performance are considerably reduced. Accordingly, a demand has existed for a study on a tire capable of combining merits of a pneumatic tire and a non-pneumatic tire and remedying demerits thereof.

SUMMARY

Embodiments of the present disclosure provide a semi-pneumatic tire and a semi-pneumatic tire manufacturing method, which are capable of achieving excellent ride comport and preventing puncture of a tire.

In accordance with a first aspect of the present disclosure, there is provided a semi-pneumatic tire, including:

a tread portion configured to make contact with a road surface; a non-pneumatic portion coupled to an inner circumferential surface of the tread portion; a pneumatic portion coupled to an inner circumferential surface of the non-pneumatic portion, the pneumatic portion including a space into which an air is filled; and bonding layers respectively interposed between the tread portion and the non-pneumatic portion and between the non-pneumatic portion and the pneumatic portion.

The non-pneumatic portion may include a band portion including an inner band coupled to an outer circumferential surface of the pneumatic portion and an outer band spaced apart from the inner band, the band portion surrounding an outer circumferential surface of the inner band; and spokes provided between the inner band and the outer band to connect the inner band and the outer band.

One or more insertion grooves may be formed on the outer circumferential surface of the pneumatic portion, and one or more insertion projections to be inserted into the insertion grooves are formed on an inner circumferential surface of the inner band.

Each of the insertion projections may include a stem portion protruding from the inner circumferential surface of the inner band, and a flange portion extending outward from a free end of the stem portion to have an enlarged cross section.

The insertion projections may be made of the same material as the inner band and integrally formed with the inner band.

An external shape of the insertion projections and an internal shape of the insertion grooves may be complementary to each other, and outer surfaces of the insertion projections make close contact with inner surfaces of the insertion grooves.

Each of the spokes may include: a first member connected at one end to an inner circumferential surface of the outer band and at the other end to an outer circumferential surface of the inner band; a second member circumferentially spaced apart from the first member and connected at one end to the inner circumferential surface of the outer band and at the other end to the outer circumferential surface of the inner band; and a third member configured to connect the first member and the second member.

The spokes may be repeatedly provided to be spaced apart in a circumferential direction, and a circumferential cross-sectional shape of a region between the spokes disposed adjacent to each other is a polygonal shape.

Each of the spokes may include: a first member connected at one end to an inner circumferential surface of the outer band and at the other end to an outer circumferential surface of the inner band; a second member transversely spaced apart from the first member and connected at one end to the inner circumferential surface of the outer band and at the other end to the outer circumferential surface of the inner band; and a third member configured to connect the first member and the second member.

The spokes may be repeatedly provided to be spaced apart in a transverse direction, and a transverse cross-sectional shape of a region between the spokes disposed adjacent to each other may be a polygonal shape.

The third member may be configured to connect central portions of the first member and the second member, and the first member and the second member may be bent about the central portions.

A sound-absorbing material may be inserted into a space defined by the first member, the second member and the third member.

The sound-absorbing material may include a laminated fiber material obtained by laminating a high-density fiber material and a low-density fiber material.

The sound-absorbing material may include a porous material.

One or more heat dissipation holes for dissipating heat may be formed on opposite transverse side surfaces of the non-pneumatic portion along a circumferential direction.

In accordance with a second aspect of the present disclosure, there is provided a semi-pneumatic tire manufacturing method, including: a step of molding and vulcanizing a pneumatic portion; a first pneumatic portion fixing step of fixing the pneumatic portion in a mold; a non-pneumatic portion injection molding step of forming a non-pneumatic portion on an outer circumferential surface of the pneumatic portion by injecting a material for formation of the non-pneumatic portion into the mold; a second pneumatic portion fixing step of fixing the pneumatic portion having the non-pneumatic portion formed on the outer circumferential surface thereof to a mold; and a tread portion forming step of wrapping a tread portion around an outer circumferential surface of the non-pneumatic portion and vulcanizing the tread portion in a chamber.

One or more insertion grooves may be formed on the outer circumferential surface of the pneumatic portion.

The semi-pneumatic tire according to one embodiment of the present disclosure is provided with a non-pneumatic portion and is therefore capable of preventing puncture of a tire and enhancing ride comport.

DETAILED DESCRIPTION

Before the detailed description of the disclosure, it should be noted that terminologies or terms used throughout the present specification or claims should not be interpreted as general or lexical meaning, and may need to be understood as meaning and concepts corresponding to technical spirit of the disclosure based on a principle that the inventor may appropriately define the terms to descript the inventor's invention according to a best mode. Therefore, embodiments and drawings of the disclosure are only examples and thus may be represent all the technical spirit of the disclosure. Accordingly, it may be understood that the scope of the disclosure may be defined by various equivalents and modifications.

Hereinafter, embodiments will be described in detail with reference to the accompanying drawings. Like reference numerals will be used for like parts throughout the drawings. Also, in describing the disclosure, if it is determined that a detailed description of related known components or functions unnecessarily obscures the gist of the present invention, the detailed description thereof will be omitted. For the same reason, some components are exaggerated, omitted or schematically illustrated in the accompanying drawings. The size of the respective components does not entirely reflect the actual size.

Figure 1:
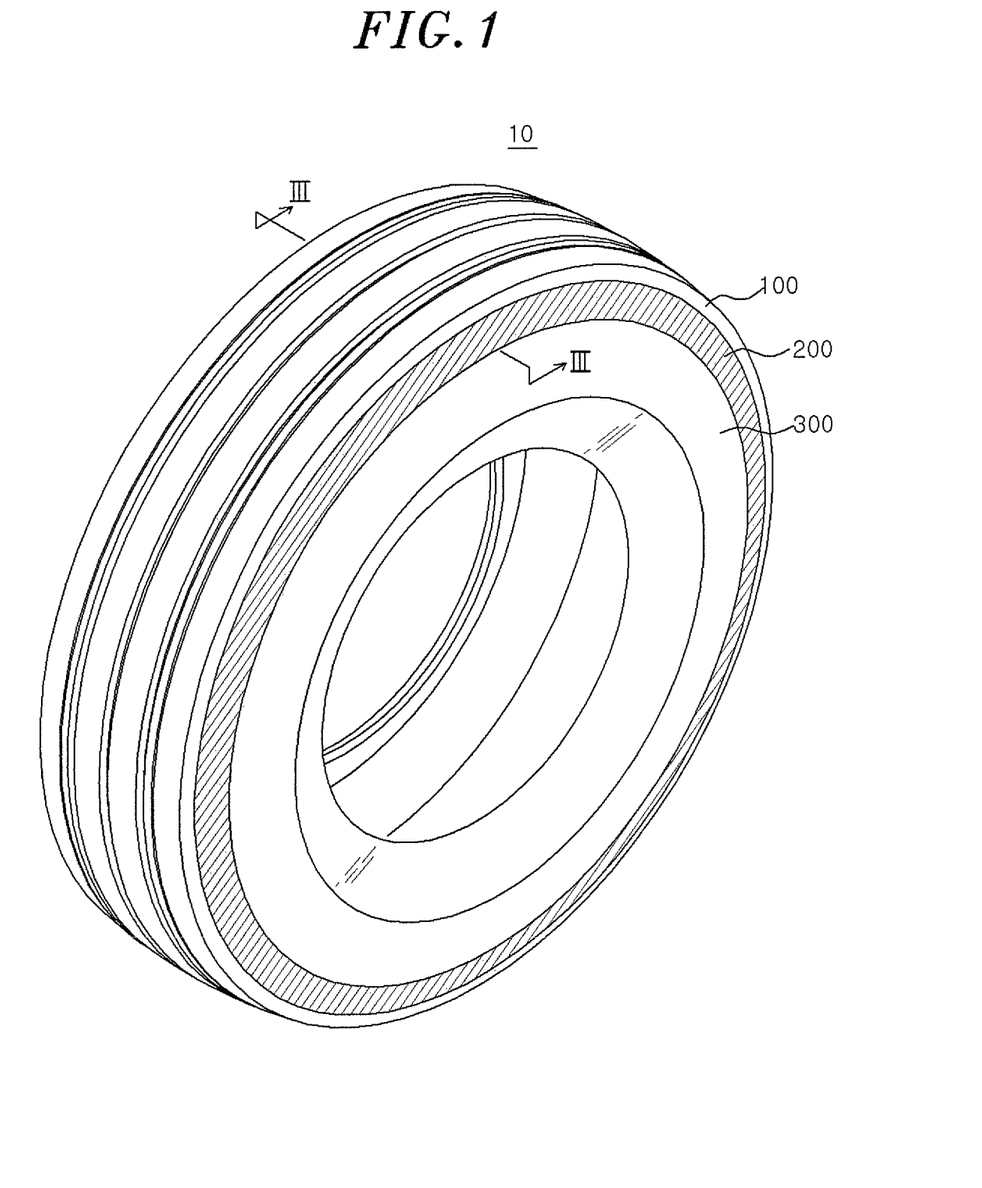
FIG. 1 is a schematic perspective view of a semi-pneumatic tire according to one embodiment of the present disclosure.
Figure 2:
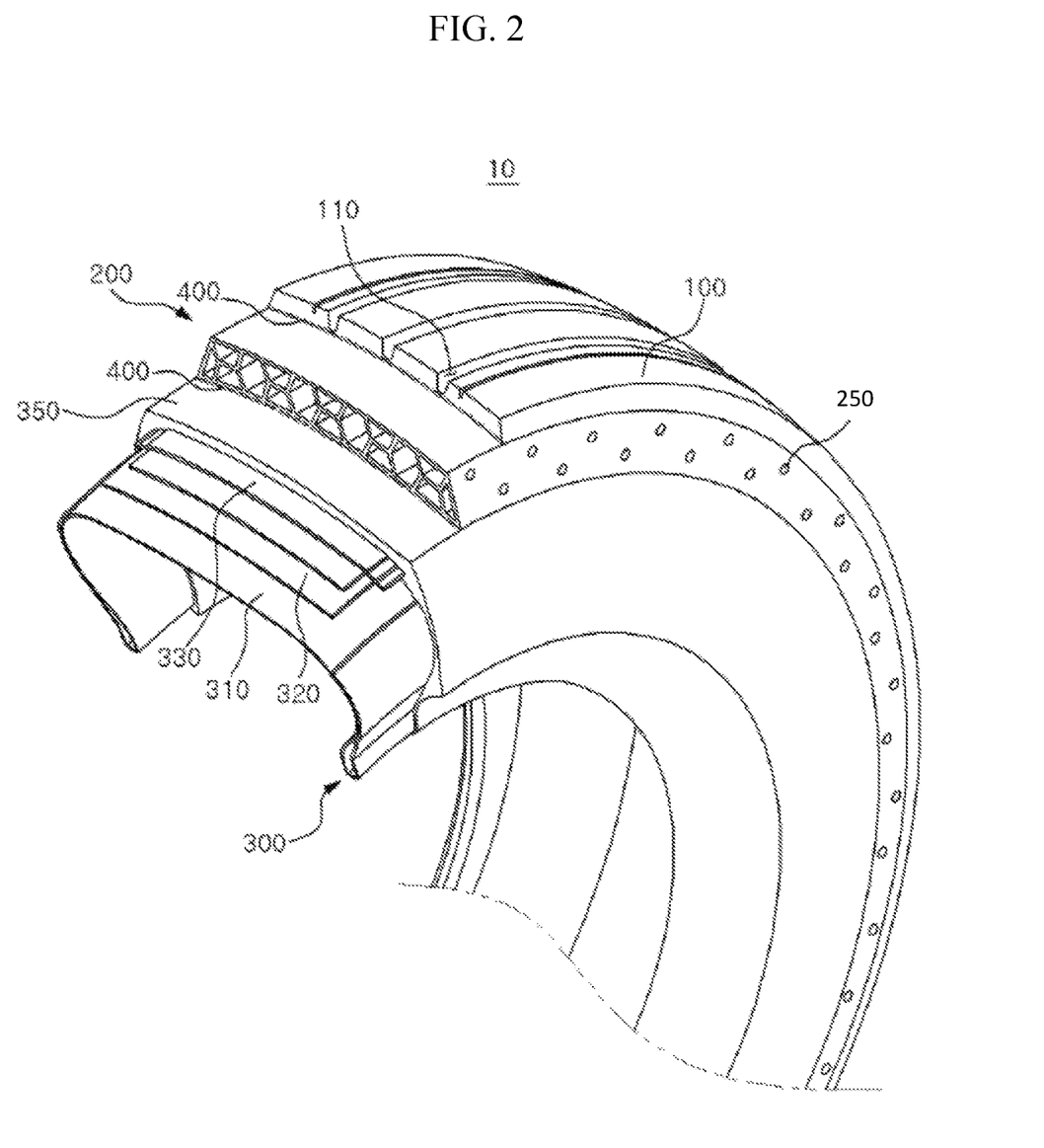
FIG. 2 is a partially cutaway schematic perspective view of the semi-pneumatic tire according to one embodiment of the present disclosure.
Figure 3:
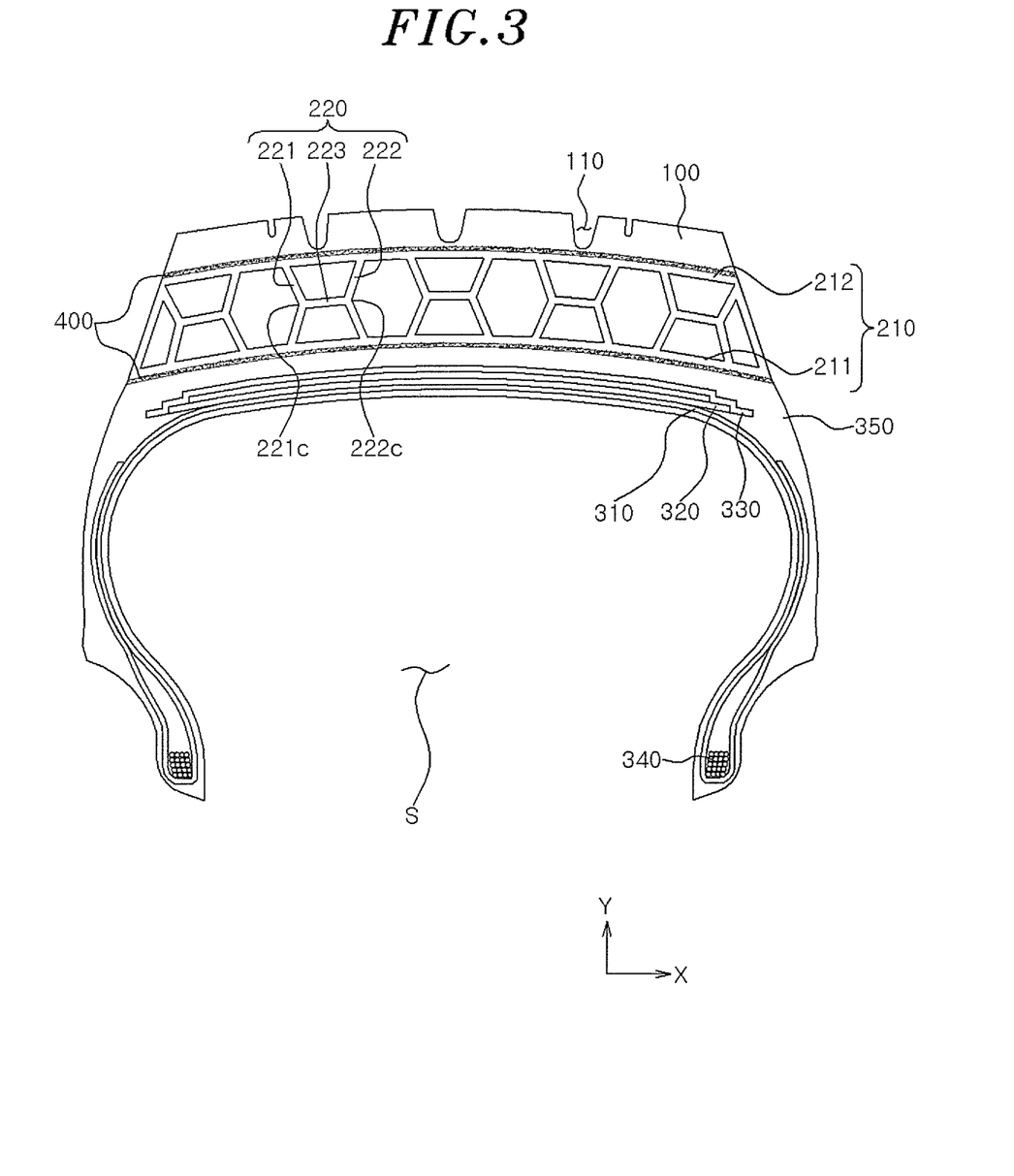
FIG. 3 is a schematic transverse sectional view taken along line in FIG. 1.

FIG. 1 is a schematic perspective view of a semi-pneumatic tire according to one embodiment of the present disclosure. FIG. 2 is a partially cutaway schematic perspective view of the semi-pneumatic tire according to one embodiment of the present disclosure. FIG. 3 is a schematic transverse sectional view taken along line in FIG. 1.

Referring to FIGS. 1 to 3, the semi-pneumatic tire 10 according to one embodiment of the present disclosure may include a tread portion 100, a non-pneumatic portion 200, a pneumatic portion 300 and a bonding layer 400.

The tread portion 100 may be disposed on the outermost side of the semi-pneumatic tire 10 and may make direct contact with a road surface during the travel of a motor vehicle.

The tread portion 100 may be made of rubber. A plurality of grooves 110 may be formed on the outer circumferential surface of the tread portion 100 to adjust the driving power, the braking power and the swiveling power of the semi-pneumatic tire 10.

The grooves 110 may have a predetermined depth from the outer circumferential surface of the tread portion 100. For example, the grooves 110 may extend in the circumferential direction and the transverse direction on the outer circumferential surface of the tread portion 100. However, the shape of the grooves 110 may be changed to various shapes well-known in the art.

The terms relating to directions will now be defined. The circumferential direction may refer to a direction extending along the outer circumferential surface of the semi-pneumatic tire on the basis of FIG. 1. The transverse direction may refer to the X-axis direction shown in FIG. 3. The radial direction may refer to the Y-axis direction shown in FIG. 3.

The non-pneumatic portion 200 may be provided on the inner circumferential surface of the tread portion 100. The non-pneumatic portion 200 may be bonded to the inner circumferential surface of the tread portion 100 by an adhesive agent. In other words, when molding the semi-pneumatic tire 10, the non-pneumatic portion 200 is molded and then an adhesive agent is coated on the outer circumferential surface of the non-pneumatic portion 200. Thereafter, the tread portion 100 is bonded to the non-pneumatic portion 200. The non-pneumatic portion 200 and the tread portion 100 may be bonded together through a vulcanizing process. Thus, the bonding layer 400 may be interposed between the non-pneumatic portion 200 and the tread portion 100.

The non-pneumatic portion 200 may include a band portion 210 including an inner band 211 coupled to the outer circumferential surface of the pneumatic portion 300 and an outer band 212 spaced apart from the inner band 211 in the radial direction and provided to surround the outer circumferential surface of the inner band 211, and spokes 220 provided between the inner band 211 and the outer band 212 to connect the inner band 211 and the outer band 212.

The non-pneumatic portion 200 may be formed of an injection-molded product. The non-pneumatic portion 200 may be molded using thermoplastic elastomer (TPE). More specifically, the non-pneumatic portion 200 may be injection-molded using at least one of thermoplastic polyester elastomer (TPEE), thermoplastic polyurethane elastomer (TPU), thermoplastic olefin elastomer (TPO) and thermoplastic polyamide elastomer (TPAE). Thus, the band portion 210 and the spokes 220 may be integrally formed with each other.

The inner band 211 may have a predetermined width and may be formed in a band shape with the circumferential opposite ends thereof connected to each other. The pneumatic portion 300 may be bonded to the inner circumferential surface of the inner band 211 by an adhesive agent. Thus, the bonding layer 400 may be interposed between the inner band 211 and the pneumatic portion 300.

The outer band 212 may be spaced apart by a predetermined distance from the inner band 211 in the radial direction and may be provided to surround the outer circumferential surface of the inner band 211. As described above, the tread portion 100 may be bonded to the outer circumferential surface of the outer band 212 by an adhesive agent.

If necessary, a belt (not shown) and a cap ply (not shown) may be provided between the inner circumferential surface of the inner band 211 and the outer circumferential surface of the pneumatic portion 300 and between the outer circumferential surface of the outer band 212 and the inner circumferential surface of the tread portion 100.

The spokes 220 may be provided between the inner band 211 and the outer band 212. Thus, the spokes 220 may serve as a support body for connecting the inner band 211 and the outer band 212. Furthermore, the spokes 220 may serve as a shock-absorbing material for primarily distributing and absorbing the shock applied to the semi-pneumatic tire 10.

Meanwhile, each of the spokes 220 may include a first member 221 connected at one end to the inner circumferential surface of the outer band 212 and connected at the other end to the outer circumferential surface of the inner band 211, a second member 222 connected at one end to the inner circumferential surface of the outer band 212 and connected at the other end to the outer circumferential surface of the inner band 211, and a third member 223 connecting the first member 221 and the second member 222. The second member 222 is transversely spaced apart from the first member 221 by a predetermined distance. The third member 223 may connect central portions 221c and 222c of the first member 221 and the second member 222. The first member 221 and the second member 222 may be bent about the central portions 221c and 222c thereof.

Referring to FIG. 3, the spokes 220 may be repeatedly provided to be spaced apart in the transverse direction. The transverse cross section (obtained by cutting the tire along the axis line thereof) of the region between the spokes 220 disposed adjacent to each other may have a polygonal shape, for example, a hexagonal shape. In other words, the transverse cross section of the space defined by the first member 221, the second member 222 of the spoke 220 disposed adjacent to the first member 221, the inner band 211 and the outer band 212 may have a hexagonal shape.

The transverse cross section of the region between the first member 221, the second member 222, the third member 223 and the outer band 212, and the transverse cross section of the region between the first member 221, the second member 222, the third member 223 and the inner band 211 may have a trapezoidal shape.

Figure 4:
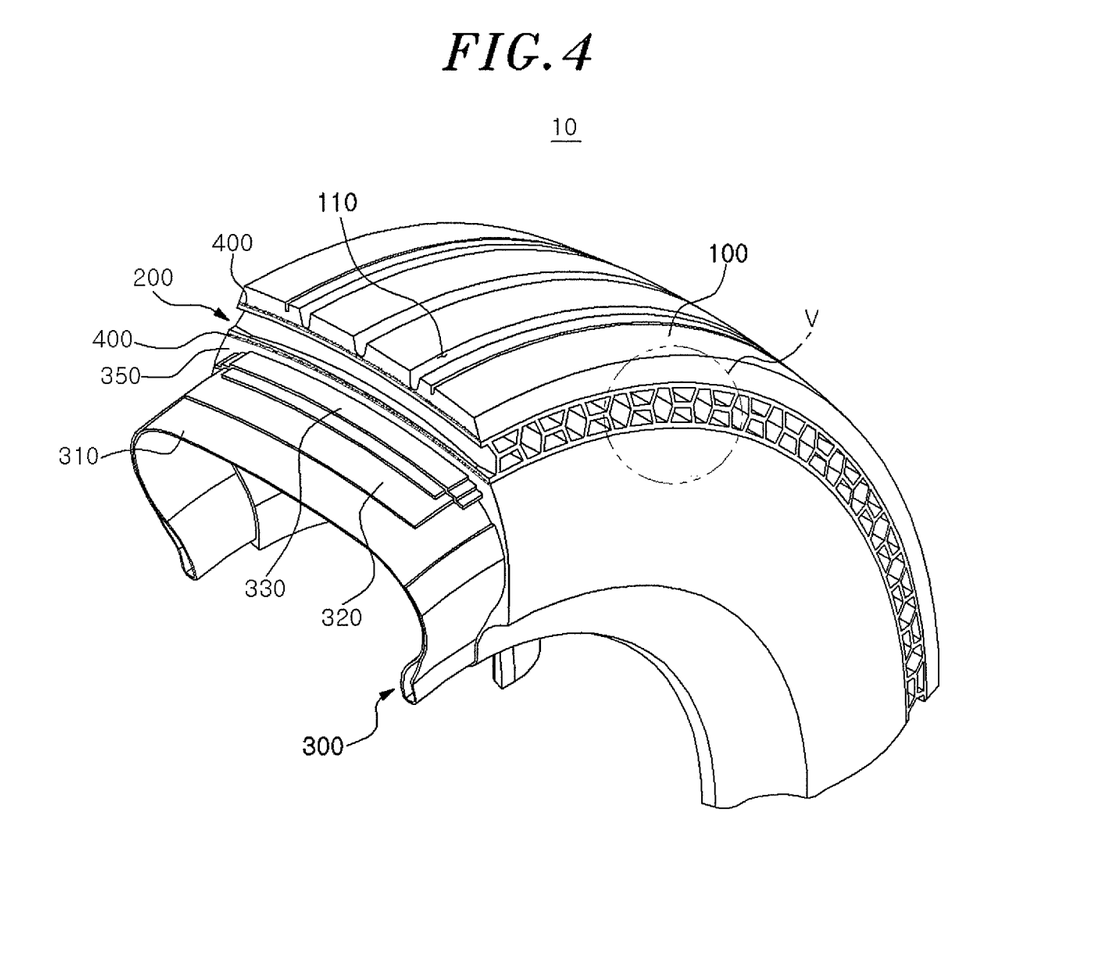
FIG. 4 is a partially cutaway schematic perspective view of a semi-pneumatic tire according to another embodiment of the present disclosure.
Figure 5:
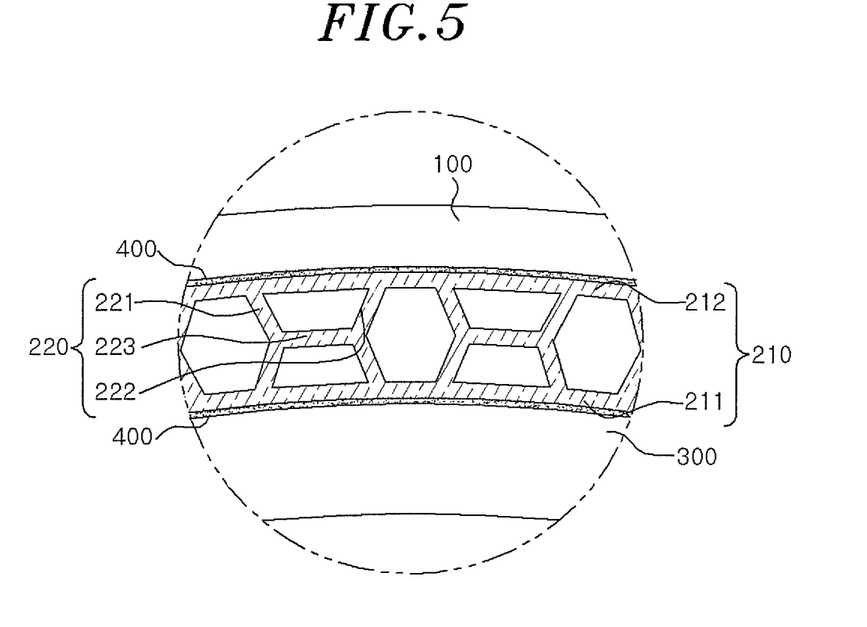
FIG. 5 is a schematic enlarged view of a portion indicated by "V" in FIG. 4.

Meanwhile, one or more heat dissipation holes 250 may be provided on the transverse side surfaces of the non-pneumatic portion 200. The heat dissipation holes 250 may be provided to outwardly dissipate the heat generated from the semi-pneumatic tire 10 during the travel of a motor vehicle. For example, the heat dissipation holes 250 may be provided at a plurality of locations and may be spaced apart by a predetermined distance along the circumferential direction. Hereinafter, a modification of the shape of the spokes 220 will be described with reference to FIGS. 4 and 5. FIG. 4 is a partially cutaway schematic perspective view of a semi-pneumatic tire according to another embodiment of the present disclosure. FIG. 5 is a schematic enlarged view of a portion indicated by B in FIG. 4.

Referring to FIGS. 4 and 5, the spokes 220 may be repeatedly provided to be spaced apart in the circumferential direction. The circumferential cross section (obtained by cutting the tire along a circumference of the tire) of the region between the spokes 220 disposed adjacent to each other may have a polygonal shape, for example, a hexagonal shape. In other words, the spokes 220 shown in FIGS. 4 and 5 differ from the spokes 220 shown in FIGS. 1 to 3 in that the spokes 220 are repeatedly provided in the circumferential direction.

In this regard, the circumferential cross section of the space defined by the first member 221, the second member 222 of the spoke 220 disposed adjacent to the first member 221, the inner band 211 and the outer band 212 may have a hexagonal shape.

The circumferential cross section of the region between the first member 221, the second member 222, the third member 223 and the outer band 212, and the circumferential cross section of the region between the first member 221, the second member 222, the third member 223 and the inner band 211 may have a trapezoidal shape.

However, in the semi-pneumatic tire 10 according to one embodiment of the present disclosure, the shape of the spokes 220 is not limited to the one described above but may be substituted by various shapes of the spokes 220 well-known in the art.

Referring again to FIGS. 1 to 3, the pneumatic portion 300 may be bonded to the inner circumferential surface of the non-pneumatic portion 200. For example, the pneumatic portion 300 may be bonded to the inner band 211 of the non-pneumatic portion 200 by an adhesive agent. Thus, the bonding layer 400 may be interposed between the non-pneumatic portion 200 and the pneumatic portion 300.

The pneumatic portion 300 may include a space S into which an air is filled. The pneumatic portion 300 may serve as a shock-absorbing member for secondarily distributing and absorbing the shock transmitted from the non-pneumatic portion 200.

The pneumatic portion 300 may include a carcass 310 serving as a skeleton, a belt 320 provided on the outer circumferential surface of the carcass 310, a cap ply 330 for minimizing the movement of the belt 320 and preventing removal of the belt 320 during the high-speed travel, beads 340 formed at both ends of the cap ply 330 and coupled to a rim (not shown) of a wheel, and a rubber layer 350 configured to form the outer surface of the pneumatic portion 300. The configuration of the pneumatic portion 300 is well-known in the art. Thus, the detailed description thereof will be omitted.

Hereinafter, a semi-pneumatic tire according to a further embodiment of the present disclosure will be described with reference to FIGS. 6A and 6B.

Figure 6A:
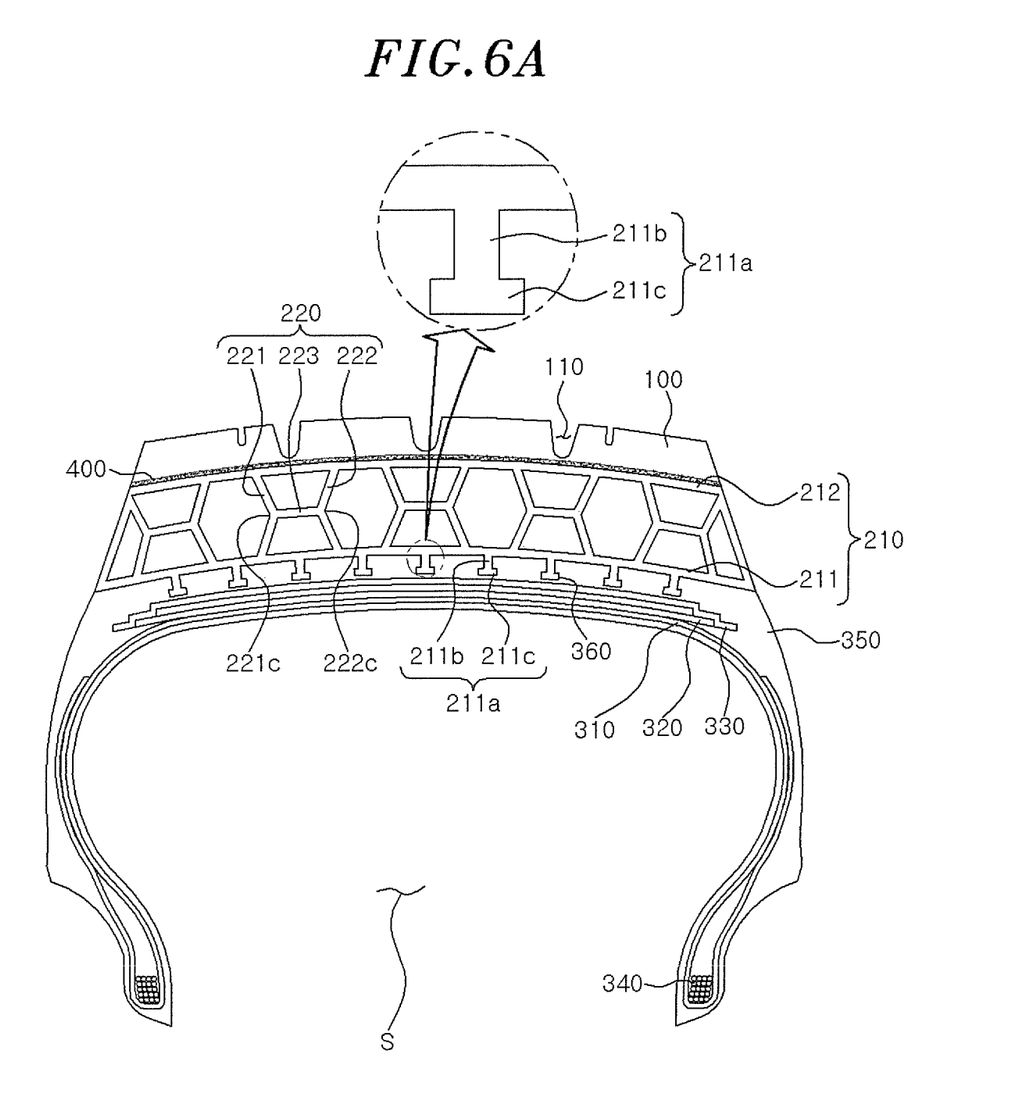
FIGS. 6A and 6B are schematic transverse sectional views of a semi-pneumatic tire according to a further embodiment of the present disclosure.
Figure 6B:
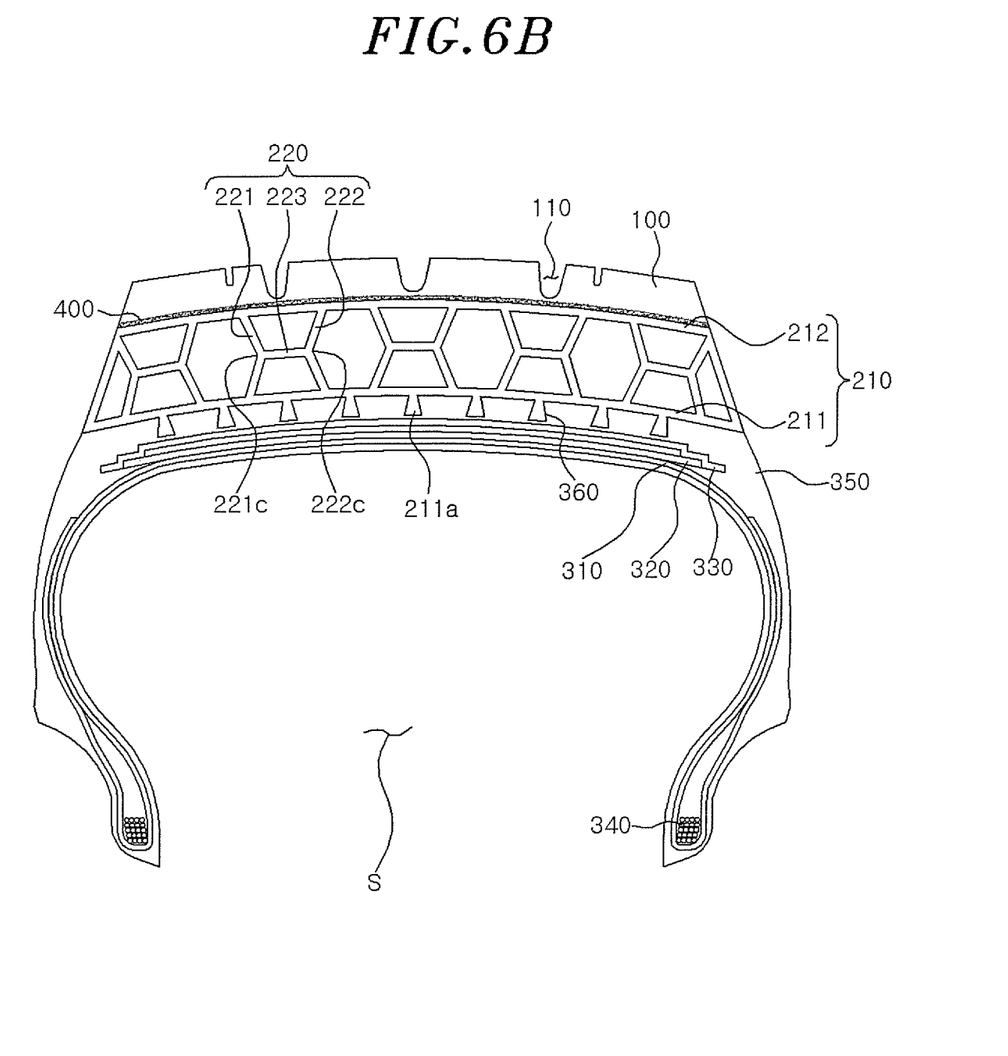

Referring to FIGS. 6A and 6B, the semi-pneumatic tire 10 according to the further embodiment of the present disclosure may include a tread portion 100, a non-pneumatic portion 200, a pneumatic portion 300 and a bonding layer 400. The configurations of the semi-pneumatic tire 10 according to the further embodiment of the present disclosure are substantially the same as the configurations of the semi-pneumatic tire 10 shown in FIGS. 1 to 3, except for the configuration of the non-pneumatic portion 200. Thus, the description on the same configurations will be omitted.

Referring to FIG. 6A, in the semi-pneumatic tire 10 according to the further embodiment of the present disclosure, the inner band 211 may include insertion projections 211a protruding radially inward. The insertion projections 211a may be spaced apart in the transverse direction.

Insertion grooves 360 into which the insertion projections 211a are inserted may be formed in the rubber layer 350 to correspond to the insertion projections 211a. Similar to the insertion projections 211a, the insertion grooves 360 may be formed on the outer circumferential surface of the rubber layer 350 in a transversely spaced-apart relationship.

The insertion projections 211a may be simultaneously formed when injection-molding the band portion 210. Thus, the insertion projections 211a and the inner band 211 may be integrally formed of the same material. Each of the insertion projections 211a may include a stem portion 211b protruding from the inner circumferential surface of the inner band 211, and a flange portion 211c extending outward from a free end of the stem portion 211b to have an enlarged cross section. In this case, the external shape of the insertion projections 211a and the internal shape of the insertion grooves 360 may be complementary to each other. Accordingly, the insertion projections 211a may be tightly fitted in the insertion grooves 360.

In FIG. 6B, there is shown another example of the insertion projections 211a. Referring to FIG. 6B, the insertion projections 211a may have a trapezoidal cross section. In other words, the insertion projections 211a may be formed so that the cross-sectional area thereof increases from the inner band 211 side toward the pneumatic portion 300 side.

As described above, in the case of the semi-pneumatic tire 10 according to the further embodiment of the present disclosure, the non-pneumatic portion 200 and the pneumatic portion 300 may be strongly combined with each other by fitting the insertion projections 211a in the insertion grooves 360 of the rubber layer 350.

The shapes of the insertion projections 211a shown in FIGS. 6A and 6B are nothing more than examples. The shape of the insertion projections 211a may be variously changed as long as the insertion projections 211a can be inserted into the rubber layer 350 of the pneumatic portion 300 through an injection molding process. On the other hand, an adhesive agent may be coated on the outer circumferential surface of the pneumatic portion 300 before the non-pneumatic portion 200 is injection-molded with the pneumatic portion 300. As a result, after the injection molding process is completed, an adhesive agent component may be contained in the non-pneumatic portion 200 adjacent to the pneumatic portion 300.

Hereinafter, a semi-pneumatic tire 10 according to a still further embodiment of the present disclosure will be described with reference to FIGS. 7 and 8.

Figure 7:
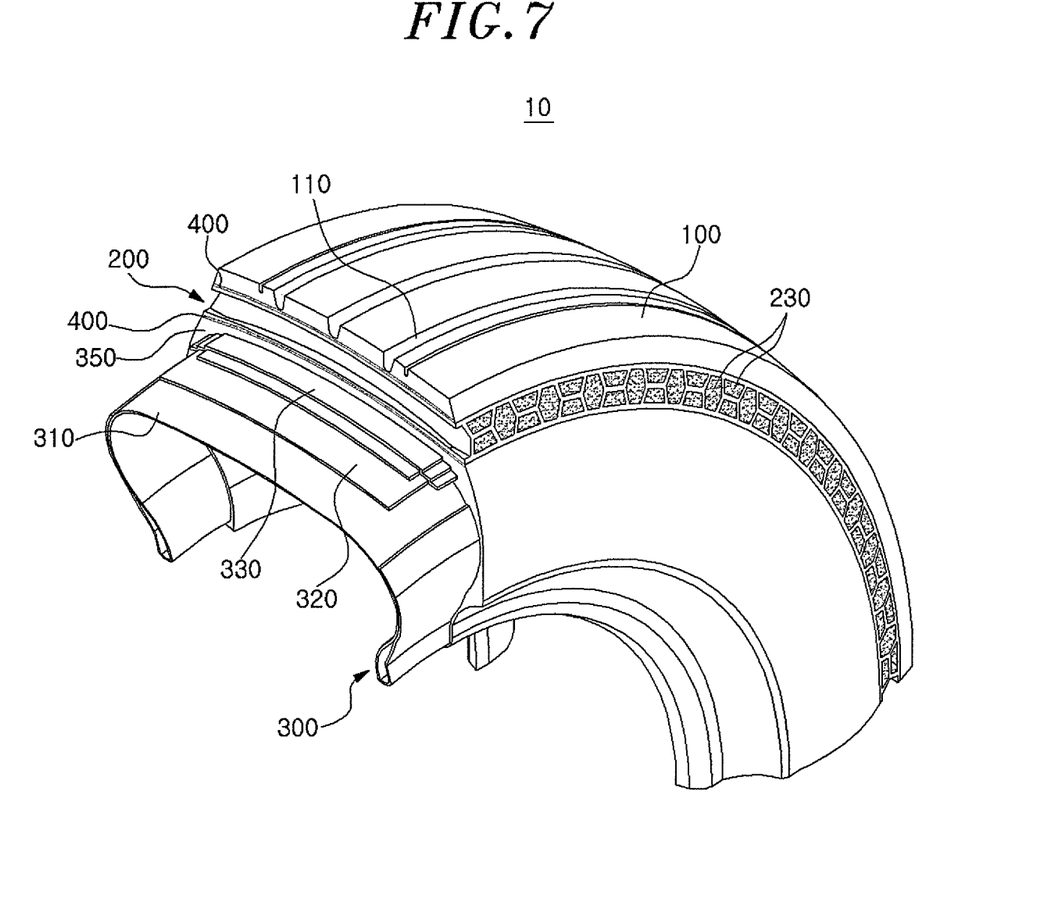
FIG. 7 is a partially cutaway schematic perspective view of a semi-pneumatic tire according to a still further embodiment of the present disclosure.
Figure 8:
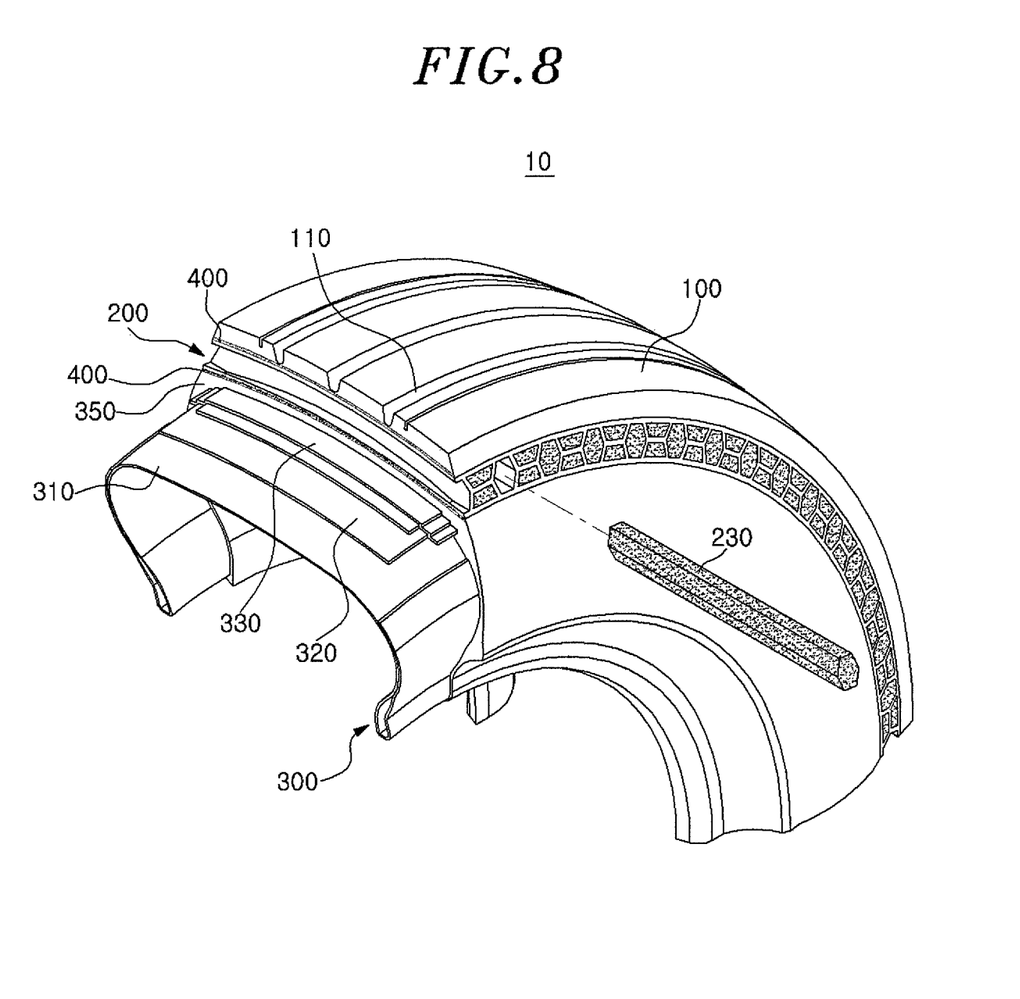
FIG. 8 is a schematic exploded perspective view of the semi-pneumatic tire shown in FIG. 7.

Referring to FIGS. 7 and 8, the semi-pneumatic tire 10 according to the still further embodiment of the present disclosure may include a tread portion 100, a non-pneumatic portion 200, a pneumatic portion 300, a bonding layer 400 and a sound-absorbing material 230. The configurations of the semi-pneumatic tire 10 according to the still further embodiment of the present disclosure are substantially the same as the configurations of the semi-pneumatic tire 10 shown in FIGS. 4 and 5, except for the configuration of the sound-absorbing material 230. Thus, the description on the same configurations will be omitted.

The sound-absorbing material 230 may be inserted into the non-pneumatic portion 200 to absorb a sound. For example, the sound-absorbing material 230 may be inserted into a space defined by the band portion 210, the first member 221, the second member 222 and the third member 223 to reduce a sound.

For easier insertion into the non-pneumatic portion 200, the sound-absorbing material 230 may be formed in a columnar shape corresponding to the cross-sectional shape of the space defined by the band portion 210, the first member 221, the second member 222 and the third member 223.

In order to enhance the sound reducing efficiency, the sound-absorbing material 230 may include a porous material or a laminated fiber material obtained by laminating a high-density fiber material and a low-density fiber material.

As a result, the semi-pneumatic tire 10 according to the still further embodiment of the present disclosure may enhance the sound reducing efficiency by inserting the sound-absorbing material 230 into the non-pneumatic portion 200.

Hereinafter, a semi-pneumatic tire manufacturing method according to a yet still further embodiment of the present disclosure will be described with reference to FIG. 9.

Figure 9:
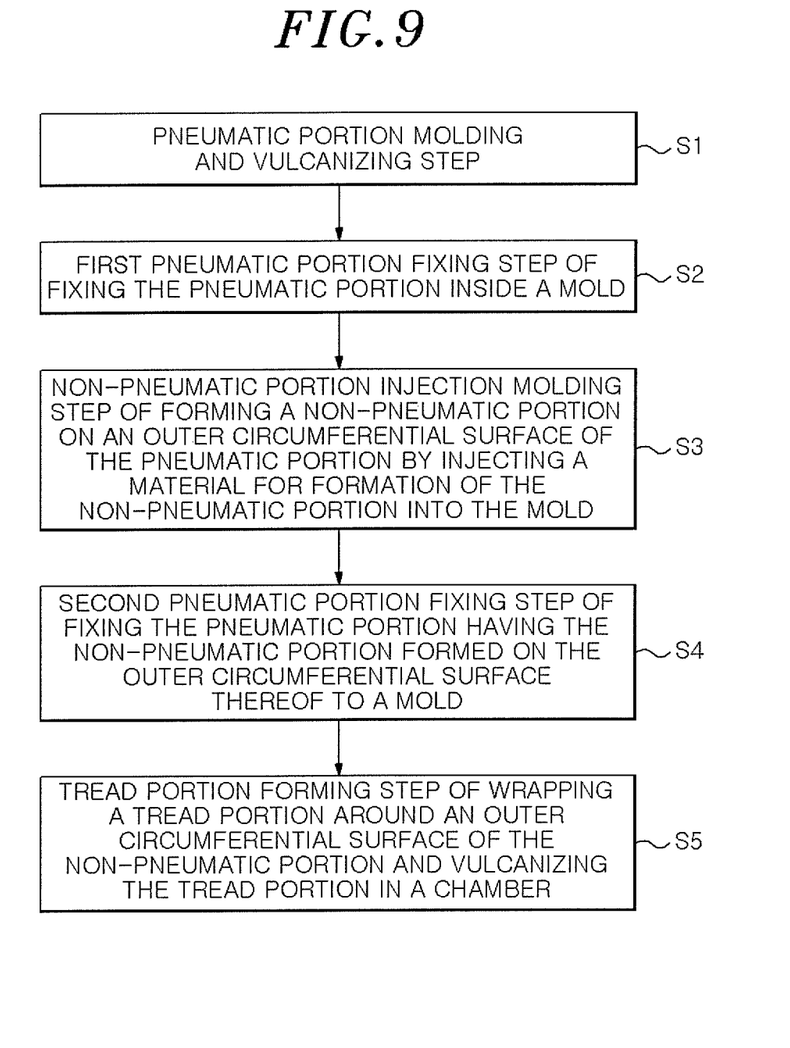
FIG. 9 is a flowchart showing a semi-pneumatic tire manufacturing method according to a yet still further embodiment of the present disclosure.

Referring to FIG. 9, a pneumatic portion molding and vulcanizing step S1 may be initially performed. In the pneumatic portion molding and vulcanizing step S1, the insertion grooves may be formed on the outer circumferential surface of the pneumatic portion. Then, a first pneumatic portion fixing step S2 of fixing the molded and vulcanized pneumatic portion in a mold. At this time, an adhesive agent may be coated on the outer circumferential surface of the pneumatic portion. After the pneumatic portion is fixed in the mold, a non-pneumatic portion injection-molding step S3 of injecting a material for the formation of the non-pneumatic portion into the mold and forming the non-pneumatic portion on the outer circumferential surface of the pneumatic portion. In this case, the non-pneumatic portion may be injection-molded using at least one of thermoplastic polyester elastomer (TPEE), thermoplastic polyurethane elastomer (TPU), thermoplastic olefin elastomer (TPO) and thermoplastic polyamide elastomer (TPAE). In the non-pneumatic portion injection-molding step S3, the band portion and the spokes constituting the non-pneumatic portion may be injection-molded. Furthermore, the insertion projections may be molded in the insertion grooves formed on the outer circumferential surface of the pneumatic portion. The insertion projections and the insertion grooves may be completely brought into contact with each other through such an injection molding process. In addition, an adhesive agent component may be contained in the injection-molded non-pneumatic portion adjacent to the pneumatic portion because the adhesive agent is coated on the outer circumferential surface of the pneumatic portion before the injection molding process.

After the non-pneumatic portion injection molding step S3 is completed, a second pneumatic portion fixing step S4 of fixing the pneumatic portion in the mold again may be performed. After the pneumatic portion is fixed, an adhesive agent may be coated on the outer circumferential surface of the pneumatic portion. After coating the adhesive agent, a tread portion forming step S5 of wrapping the tread portion around the outer circumferential surface of the pneumatic portion and vulcanizing the tread portion in a chamber may be performed.

As described above, in the semi-pneumatic tires 10 according to the embodiments of the present disclosure, the non-pneumatic portion 200 is provided on the outer circumferential surface of the pneumatic portion 300. It is therefore possible to prevent puncture of the semi-pneumatic tire 10 while maintaining the ride comport and the vibration-absorbing performance which are merits of a pneumatic tire.

While the disclosure has been shown and described with respect to the embodiments, it will be understood by those skilled in the art that various changes and modifications may be made without departing from the scope of the disclosure as defined in the following claims.

What is claimed is:

1. A semi-pneumatic tire, comprising:
   a tread portion configured to make contact with a road surface;
   a non-pneumatic portion coupled to an inner circumferential surface of the tread portion;
   a pneumatic portion coupled to an inner circumferential surface of the non-pneumatic portion, the pneumatic portion including a space into which an air is filled; and
   bonding layers respectively interposed between the tread portion and the non-pneumatic portion and between the non-pneumatic portion and the pneumatic portion,
   wherein the non-pneumatic portion includes:
   a band portion including an inner band coupled to an outer circumferential surface of the pneumatic portion and an outer band spaced apart from the inner band, the band portion surrounding an outer circumferential surface of the inner band; and
   spokes provided between the inner band and the outer band to connect the inner band and the outer band,
   wherein each of the spokes includes:
   a first member connected at one end to an inner circumferential surface of the outer band and at the other end to an outer circumferential surface of the inner band;
   a second member circumferentially spaced apart from the first member and connected at one end to the inner circumferential surface of the outer band and at the other end to the outer circumferential surface of the inner band; and
   a third member configured to connect the first member and the second member,
   wherein a space is defined by the first member, the second member, and the third member of the spokes, the space being continuously extended in an axial direction of the semi-pneumatic tire along an entire axial width of the non-pneumatic portion,
   wherein a sound-absorbing material is inserted to be entirely accommodated in the space,
   wherein an external shape of the sound-absorbing material and a shape of the space are complementary to each other,
   wherein the space includes a first space and a second space radially outward from the first space,
   wherein a plurality of insertion grooves are formed on the outer circumferential surface of the pneumatic portion, and a plurality of insertion projections to be inserted into the insertion grooves are formed on an inner circumferential surface of the inner band,
   wherein each of the insertion projections is formed so that a pneumatic portion side cross-sectional area is larger than an inner band side cross-sectional area, and
   wherein an entire inner circumferential surface of the inner band makes surface contact with the outer circumferential surface of the pneumatic portion.

2. The semi-pneumatic tire of claim 1, wherein the insertion projections are made of the same material as the inner band and integrally formed with the inner band.

3. The semi-pneumatic tire of claim 1, wherein an external shape of the insertion projections and an internal shape of the insertion grooves are complementary to each other, and outer surfaces of the insertion projections make close contact with inner surfaces of the insertion grooves.

4. The semi-pneumatic tire of claim 1, wherein the spokes are repeatedly provided to be spaced apart in a circumferential direction, and a circumferential cross-sectional shape of a region between the spokes disposed adjacent to each other is a polygonal shape.

5. The semi-pneumatic tire of claim 1, wherein the third member is configured to connect central portions of the first member and the second member, and the first member and the second member are bent about the central portions.

6. The semi-pneumatic tire of claim 1, wherein the sound-absorbing material includes a laminated fiber material obtained by laminating a high-density fiber material and a low-density fiber material.

7. The semi-pneumatic tire of claim 1, wherein the sound-absorbing material includes a porous material.

8. The semi-pneumatic tire of claim 1, wherein the sound-absorbing material is exposed to an outside of the semi-pneumatic tire.

* * * * *